United States Patent [19]

Sims

[11] 3,966,839

[45] June 29, 1976

[54] HOMOGENEOUS BLENDS OF POLYAMIDES WITH VINYL AROMATIC RESINS

[75] Inventor: Willard M. Sims, Leominster, Mass.

[73] Assignee: Foster Grant Co., Inc., Leominster, Mass.

[22] Filed: Jan. 30, 1975

[21] Appl. No.: 545,268

[52] U.S. Cl. ........................................ 260/857 UN
[51] Int. Cl.² ........................................ C08L 77/06
[58] Field of Search .................. 260/857 UN, 857 L

[56] References Cited
UNITED STATES PATENTS

| | | | |
|---|---|---|---|
| 3,236,914 | 2/1966 | Murdock et al. ................ | 260/857 |
| 3,359,344 | 12/1967 | Fukushima .................... | 260/857 L |
| 3,484,403 | 12/1969 | Brunson et al. ................ | 260/857 L |
| 3,644,571 | 2/1972 | Anderson et al. ............... | 260/857 UN |
| 3,673,277 | 6/1972 | Schmitt et al. ................ | 260/857 UN |
| 3,746,609 | 7/1973 | Stange et al. .................. | 161/165 |

Primary Examiner—Murray Tillman
Assistant Examiner—Thurman K. Page
Attorney, Agent, or Firm—Michael J. Tully

[57] ABSTRACT

Compositions based on blends of polyamide and vinyl aromatic resins having improved resistance to fibrillation may be prepared by the addition of a minor amount of a copolymer comprising a vinyl aromatic monomer and maleic anhydride followed by thorough mixing of the blend components at a temperature in excess of the melting point of the composition. Compositions prepared according to this invention exhibit improved resistance to fibrillation and good compatibility.

11 Claims, No Drawings

3,966,839

HOMOGENEOUS BLENDS OF POLYAMIDES WITH VINYL AROMATIC RESINS

BACKGROUND OF THE INVENTION

This invention relates to compositions based on blends of polyamide and vinyl aromatic resins, particularly such compositions having improved compatibility and resistance to fibrillation.

Polyamide resins have long been known for their excellent toughness, flexibility, abrasion resistance and relatively high impact strength. Molded or extruded polyamides in general have found applications in appliances, consumer products, electronics or machine components, automotive parts, gears and like uses. In addition, spun fibers or filaments are used in textile and automotive tires as reinforcing materials.

Although the properties of the most popular polyamides today such as polyhexamethylene adipamide (nylon 66), polycaprolactum (nylon 6), poly (11-aminoundecanoic acid) (nylon - 11), or various nylon copolymers render these materials desirable in most applications, these and other polyamide polymers may suffer certain drawbacks in terms of lack of relative stiffness, relatively low Young's Modulus, and hygroscopicity.

It has been proposed in the prior art to modify the properties of polyamide resins by forming blends with other resinous materials, which have certain desirable properties not inherent in the polyamides, without sacrificing to any great extent the inherently good mechanical properties of the polyamide. For example, according to U.S. Pat. No. 3,093,255, hydrocarbon polymers such as polyethylene have been blended with polyamide resins to yield compositions that have improved permeability properties and are processible into films, filaments and bottles. Improvements in moisture resistance, impact strength, flexibility or molding characteristics have been obtained by forming blends of polyamides with graft or random copolymers of a monoolefin and a carboxylic acid or acid ester, as disclosed in U.S. Pat. Nos. 3,236,914 or 3,472,916, or by forming blends of a polyamide, a polyolefin and an olefin/carboxylic acid copolymer as disclosed in U.S. Pat. No. 3,373,223.

Polystyrene or styrene copolymers have long been known for their extremely good processing characteristics, moisture resistance and stiffness, although suffering from relatively poor mechanical properties when compared with the polyamides. Attempts to form blends consisting of polystyrene and polyamide resins to impart the desirable properties of each in a composition have not been entirely successful because these materials are incompatible. For example, blends consisting essentially of a polyamide and polystyrene have been prepared and extruded into rods only to find that the rods tend to fibrillate or split when subjected to mechanical strain. This fibrillation is caused by a splitting at the phase interfaces of the non-compatible resins in the blend. Although compatibility problems have been minimized in melt spun fibers based on polystyrene/polyamide blends by devising special spinning and quenching techniques, as taught for example in U.S. Pat. No. 3,330,899, or by incorporating polyamide/polystyrene graft copolymers into the blend, as taught by U.S. Pat. No. 3,334,153, the fibrillation problem is not so readily resolved where blends are processed into shaped goods such as by extrusion and by compression or injection molding operations.

Accordingly, it is an object of the present invention to prepare compositions comprising blends of polyamide and vinyl aromatic resins having improved resistance to fibrillation.

Another object is to prepare polyamide resin compositions having improved stiffness and water permeation properties.

Another object is to prepare vinyl aromatic resin compositions having improved flexibility and modulus characteristics.

SUMMARY OF THE INVENTION

These and other objects of the invention may be achieved by including a minor amount of a copolymer of a vinyl aromatic monomer, such as styrene, and maleic anhydride in blends composed of a polyamide resin and a resin comprising a polymerized vinyl aromatic monomer such as polystyrene. Blending may be achieved by forming an intimate admixture of the resins and the copolymer, and masticating the admixture at a temperature at or above the softening or melting point of the mixture for a period of time sufficient to form a substantially homogeneously dispersed composition. Mastication may be most readily carried out in a heated screw mixer/extruder.

The resultant homogeneous blends have many advantageous properties. Blends composed predominantly of the polyamide component exhibit improved stiffness and water permeation properties as opposed to polyamides alone, while blends composed primarily of the polymerized vinyl aromatic material, e.g., polystyrene, exhibit improved flexibility and modulus characteristics as compared with polystyrene alone. In addition, molded or extruded articles prepared from the blends do not exhibit a marked tendency to fibrillate which is characteristic of unmodified polyamide/polystyrene blends.

DETAILED DESCRIPTION OF THE INVENTION

Polyamide materials operable in the present invention include any and all of those polymers characterized by a recurring carbonamide group in the polymer chain and being of sufficient molecular weight for extrusion or molding purposes. Examples of suitable polymers include poly (hexamethylene adipamide), polycaprolactam or poly caproamide, poly (decamethylene oxamide), polyundecanoamide, polyester/amides and like materials as well as mixtures and copolymers of the polyamides. Typically the polyamides will have an average molecular weight within the range of about 5,000 to 25,000, preferably 10,000 to 20,000 and melting points within the range of about 350° to 500°F.

Vinyl aromatic resins suitable for the blends of the present invention include those resins derived from styrene or substituted styrene monomers such as alpha methyl styrene or vinyl toluene. This would include polystyrene and copolymers comprising a predominant proportion of styrene and/or substituted styrene with such monomers as acrylonitrile, methacrylonitrile, isobutylene, butadiene, acrylic or methacrylic acids and their derivatives, and mixtures of these monomers. The molecular weight and softening point of the vinyl aromatic resins should be sufficient to render them suitable as extrusion or molding grade materials.

The interlacing agent employed in the present invention is a copolymer of a vinyl aromatic monomer such as styrene or a substituted styrene with maleic anhydride. Best results are achieved where the vinyl aromatic monomer of the interlacing agent is the same as the monomer of the vinyl aromatic resin. The preferred material comprises a randomly polymerized copolymer of styrene and maleic anhydride containing from about 50 to 75 mole % of polymerized styrene. Among suitable copolymers which may be used are those having an average molecular weight within the range of about 1,000 to about 3,000; a melting point in the range of about 125° to 350°F and an acid number in the range of about 100 to 500.

The mechanism under which the interlacing agent acts to reduce fibrillation and promote homogeneity of the blend is not precisely known, although it appears that the carboxy functionality of the copolymerized maleic anhydride may condense with terminal amino groups present on the polyamide chains. The polymerized vinyl aromatic component of the interlacing agent is on the other hand compatible with the vinyl aromatic resin component of the blend. Regardless of the mechanism, the normally non-compatible blend components are readily interdispersed such that fibrillation or splitting is reduced or eliminated in shaped articles composed of the resinous blend.

Although the blends may be prepared in any proportion, i.e., from about 1 to 99% by weight of either major resin, it has been experienced that advantages of the present invention in terms of fibrillation resistance are not realized to any great extent when the polyamide and vinyl aromatic resins are present in approximately equiweight amounts, i.e., about 50 ± 5% of vinyl aromatic resin and polyamide. This is believed due to the fact that one of the resin components of the blend must be present in a sufficient amount to form a matrix. Thus, preferred blends should contain at least about 55% by weight of the vinyl aromatic resin or the polyamide. However, equiweight blends do have utility as a convenient method for introducing the copolymeric interlacing agent into master batches containing more than about 55% by weight of either resinous component.

In the preferred embodiment, blends containing from about 5 to 80% by weight of vinyl aromatic resin and correspondingly from about 95 to 20% by weight polyamide have been found most useful. For example, blends composed of about 95 to 55% by weight polyamide and about 5 to 45% by weight polystyrene exhibit improved stiffness over the polyamide alone while retaining to a large degree the good toughness and mechanical strength associated with polyamide resins. This improved stiffness is extremely desirable in molded articles such as sprocket gears, appliance housings, fan blades, bristle brushes and like articles where undue flexibility of the plastic is not a particularly desirable characteristic. By the same token, blends composed of from about 20 to 45% by weight polyamide and correspondingly about 80 to 55% by weight of polystyrene exhibit improved flexibility over polystyrene alone, thereby rendering such blends more suited to typical polystyrene applications where these characteristics are desirable.

The amount of the interlacing copolymer required based on total weight of the polyamide and vinyl aromatic resins present in the composition may vary depending on the nature of and relative proportions of each of the resinous components of the blend. Generally speaking, less than about 5% by weight of the copolymer is suitable. In most instances, satisfactory results may be obtained by using from about 0.1% to about 1.5% by weight of the copolymer based on the total weight of vinyl aromatic and polyamide resins.

Initial mixtures may be prepared by any suitable technique which will insure a thorough and uniform admixture of the polyamide, the vinyl aromatic resin and the interlacing copolymer. For example, the major resins may be first thoroughly mixed in pellet, flake or powder form, followed by the addition of the interlacing copolymer in the form of a powder or a solution. Alternatively, mixed pellets or flakes of the major resins may be coated with a liquid such as mineral oil, and the interlacing copolymer sprinkled thereon in the form of a finely divided powder so as to uniformly coat and adhere to the pellets or flakes. Another technique for mixing would be to incorporate the interlacing copolymer into a hot melt of one or both of the major resins under mixing conditions.

The fibrillation resistant composition of this invention is prepared by masticating the above prepared mixture or otherwise subjecting it to mechanical work at a temperature in excess of the melting or softening point of that component of the blend which has the highest melting or softening point, but below the degradation temperature of the composition. In the case of blends containing a polyamide, polystyrene and copolymer of styrene and maleic anhydride, a temperature within the range of about 350° to 600°F is suitable. Residence time at this temperature need only be sufficient as would be required to form a homogeneous blend of normally compatible polymers. The mixture may then be extruded and cooled into rods for pelletizing or directly extruded or molded into shaped articles such as bottles, fibers, films, filaments, machine parts and like materials.

Compositions prepared according to the present invention may also contain other ingredients as are known in the polymer arts such as pigments, fillers, lubricants, nucleating agents, stabilizers, plasticizers and like additives.

The following examples are illustrative of several specific embodiments of the present invention.

EXAMPLE 1

The following ingredients were provided:

| | Parts by weight |
|---|---|
| Polycaprolactam | 357.7 |
| Polystyrene | 90.0 |
| Styrene/maleic anhydride copolymer* | 2.3 |
| Mineral oil | 0.5 |

*SMA-1000 available from Arco Chemical Co. This material has an equimolar ratio of polymerized styrene and maleic anhydride, an average molecular weight of 1600, melting range of 302° to 338°F and acid number of about 480.

The polystyrene and polycaprolactam in pellet form were first tumbled together in a drum to form a random pellet mixture. Next, the mineral oil was poured over the tumbling pellets and mixing continued until all of the pellets were uniformly coated. The styrene/maleic anhydride copolymer in the form of a finely divided powder was then uniformly sprinkled on the pellets and tumbling continued until the pellets were uniformly coated.

The above mixture was then fed into a screw extruder operated at a temperature to produce a melt temperature of about 440° to 450°F. The mixture was advanced through the extruder where melting and mixing took place, and extruded through a breaker plate having holes of approximately 0.1 inch diameter. The extrudate was cooled in a water trough and cut in the shape of long thin rods.

The rods were evaluated for tendency to fibrillate by flexing or straining them in the hands. The rods showed no sign of fibrillation or splitting either throughout their length or at their cut ends. Films, monofilaments and molded bars processed from these rods also exhibited no tendency to split or fibrillate.

EXAMPLE II

A blend was prepared having exactly the same composition as Example I except that the styrene/maleic anhydride copolymer was not included. The components were also tumbled and processed as recited in Example I.

Extruded rods were found to split at the cut ends and exhibited cracks or haze throughout their length when flexed. Similar properties were observed in fibers and films prepared from these rods.

EXAMPLE III

Example I was repeated using the following ingredients:

|  | Parts by weight |
|---|---|
| Polycaprolactam | 355.0 |
| Polystyrene | 90.0 |
| SMA 2625A* | 4.5 |
| Mineral oil | 0.5 |

*Arco Chemical Company. This material has a styrene to maleic anhydride ratio of about 2 to 1, molecular weight of 1900, melting range of 275° to 302°F and an acid number of about 220.

The ingredients were mixed and processed into extruded rods by the method of Example I. The extruded rods exhibited no tendency to fibrillate.

EXAMPLE IV

Example I was repeated using the following ingredients:

|  | Parts by weight |
|---|---|
| Polycaprolactam | 389.0 |
| Polystyrene | 1167.0 |
| SMA-1000 | 15.4 |
| Mineral oil | 1.6 |

The ingredients were mixed and processed into extruded rods by the method of Example I. The extruded rods exhibited no tendency to fibrillate.

What I claim is:

1. A composition comprising a homogeneous blend of:
    a. a polyamide resin;
    b. a vinyl aromatic resin; and
    c. a copolymer comprising a vinyl aromatic monomer copolymerized with maleic anhydride, said copolymer present at a level within the range of about 0.1 to about 5% by weight based on resin content, said polyamide resin or said vinyl aromatic resin present at a level of from about 55 to 99% by weight based on the total weight of said polyamide and vinyl aromatic resins present in the composition.

2. The composition of claim 1 containing about 5 to 45% by weight of vinyl aromatic resin and correspondingly about 95 to 55% by weight of polyamide resin.

3. The composition of claim 1 containing about 55 to 80% by weight of vinyl aromatic resin and correspondingly about 45 to 20% by weight of polyamide resin.

4. The composition of claim 1 wherein said copolymerized vinyl aromatic monomer is styrene.

5. The composition of claim 1 wherein said vinyl aromatic resin is polystyrene and said copolymer is present at a level of about 0.1 to 1.5% by weight.

6. The composition of claim 1 wherein said copolymer contains from about 50 to 75 mole % styrene.

7. The composition of claim 5 wherein said polyamide comprises polycaprolactam.

8. A method for preparing a homogeneous blend of polymeric materials comprising:
    a. forming an admixture comprising a polyamide resin, a vinyl aromatic resin, and a copolymer comprising a vinyl aromatic monomer copolymerized with maleic anhydride, said polyamide resin or said vinyl aromatic resin present at a level of from about 55 to 99% by weight of the admixture;
    b. mechanically masticating said admixture at a temperature in excess of the melting point of the polyamide ion until a homogeneous composition is formed; and
    c. shaping and cooling said composition.

9. The method of claim 8 wherein said admixture comprises from about 95 to 55% by weight polyamide, about 5 to 45% by weight vinyl aromatic resin and 0.1 to 5% by weight of said copolymer.

10. The method of claim 9 wherein said vinyl aromatic resin is polystyrene and said copolymerized vinyl aromatic monomer is styrene.

11. The method of claim 8 wherein said mastication temperature is in excess of about 350° F.

* * * * *